US009476339B2

(12) United States Patent
Meier et al.

(10) Patent No.: US 9,476,339 B2
(45) Date of Patent: Oct. 25, 2016

(54) RECESSED EXHAUST REDUCTANT INJECTOR WITH COVER PLATE

(71) Applicant: CUMMINS EMISSION SOLUTIONS, INC., Columbus, IN (US)

(72) Inventors: Jason Meier, Fitchburg, WI (US); Vipin Iyer, Madison, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/660,104

(22) Filed: Mar. 17, 2015

(65) Prior Publication Data

US 2016/0273434 A1 Sep. 22, 2016

(51) Int. Cl.
*F01N 3/00* (2006.01)
*F01N 3/28* (2006.01)
*F01N 3/20* (2006.01)

(52) U.S. Cl.
CPC ............ *F01N 3/2896* (2013.01); *F01N 3/206* (2013.01); *F01N 3/2066* (2013.01)

(58) Field of Classification Search
USPC .......... 60/274, 286, 295, 299, 301, 303, 324
See application file for complete search history.

(56) References Cited

U.S. PATENT DOCUMENTS

| 6,620,391 | B2* | 9/2003 | Muller | B01D 53/8631 |
| | | | | 423/210 |
| 7,908,847 | B2* | 3/2011 | Crawley | F01N 3/025 |
| | | | | 431/12 |
| 7,958,721 | B2* | 6/2011 | Craig | F01N 3/0253 |
| | | | | 60/274 |
| 8,800,275 | B2* | 8/2014 | Crandell | F01N 3/2066 |
| | | | | 60/295 |
| 8,893,481 | B2* | 11/2014 | Katou | F01N 3/10 |
| | | | | 60/295 |
| 8,938,954 | B2* | 1/2015 | De Rudder | F01N 3/00 |
| | | | | 60/286 |
| 9,291,081 | B2* | 3/2016 | Stanavich | F01N 3/2093 |
| 2010/0077710 | A1 | 4/2010 | Severance et al. | |
| 2013/0309142 | A1 | 11/2013 | Gruber | |
| 2014/0150840 | A1 | 6/2014 | Vitek et al. | |
| 2014/0334987 | A1 | 11/2014 | Stanavich et al. | |

OTHER PUBLICATIONS

Office Action for U.S. Appl. No. 14/811,556 dated Jul. 29, 2016.

* cited by examiner

*Primary Examiner* — Binh Q Tran
(74) *Attorney, Agent, or Firm* — Foley & Lardner LLP

(57) ABSTRACT

An aftertreatment system comprises a housing defining an internal volume. The housing includes an inlet, an outlet and a sidewall defining a recess therein. A base is positioned within the recess. The base includes an injection port which is in communication with the internal volume. An injector is disposed on the base and is disposed completely within the recess. The injector is in fluidic communication with the internal volume via the injection port. The injector is configured to inject an exhaust reductant into the internal volume via the opening. A cover plate can be disposed over the recess and structured to prevent objects from impacting the injector.

21 Claims, 4 Drawing Sheets

RECESSED EXHAUST REDUCTANT INJECTOR WITH COVER PLATE

TECHNICAL FIELD

The present disclosure relates generally to exhaust aftertreatment systems for use with internal combustion (IC) engines.

BACKGROUND

Exhaust aftertreatment systems are used to receive and treat exhaust gas generated by engines (e.g., IC engines). Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the SOx and/or the NOx gases. The reduction byproducts of the exhaust gas are then fluidically communicated to the catalyst included in the SCR aftertreatment system to decompose substantially all of the SOx and/or NOx gases into relatively harmless byproducts which are expelled out of such conventional SCR aftertreatment systems.

The aftertreatment system includes an injector which is configured to inject the exhaust reductant into the aftertreatment system. The injector can include nozzles, valves and/or pumps or other components. The injector is configured to inject a predetermined volume of the exhaust reductant into the aftertreatment system based on operating conditions. In conventional aftertreatment systems, the injector is disposed on an outside surface of the aftertreatment system and is in fluidic communication with the aftertreatment system. In such implementations, the injector is susceptible to damage by objects striking the injector. For example, when the aftertreatment system is included in a vehicle (e.g., a diesel engine operated vehicle), an injector disposed on the exterior of the aftertreatment system included in the vehicle is susceptible to impact from rocks, debris or other objects which can damage the injector leading to malfunction of the aftertreatment system and/or degrade the performance of the aftertreatment system.

SUMMARY

Embodiments described herein relate generally to exhaust aftertreatment systems for use with IC engines, and in particular to exhaust aftertreatment systems that include an injector recessed within a housing of the aftertreatment system.

In some embodiments, an aftertreatment system comprises a housing defining an internal volume. The housing includes an inlet, an outlet and a sidewall defining a recess therein. A base is positioned within the recess. The base includes an injection port which is in fluidic communication with the internal volume. An injector is disposed on the base. Moreover, the injector is disposed completely within the recess. The injector is in fluidic communication with the internal volume via the injection port. The injector is configured to inject an exhaust reductant into the internal volume via the injection port. A selective catalytic reduction system is disposed in the internal volume and structured to receive a mixture of an exhaust gas and the exhaust reductant. The selective catalytic reduction system includes at least one catalyst formulated to treat the exhaust gas.

In particular embodiments, the aftertreatment system also includes a cover plate disposed over the recess and structured to prevent objects from impacting the injector. In one embodiment, the cover plate is removably coupled to the sidewall defining the recess. In another embodiment, a plurality of openings are defined in the cover plate.

In yet another embodiment, the injector includes a base plate which is removably coupled to the base of the recess via at least one fastener. In still another embodiment, a handle is disposed on the base plate. The handle is structured to be engaged by a user to either selectively dispose the injector in the recess or selectively remove the injector from the recess. In other embodiments, the aftertreatment system can also comprise at least one of a filter, a body mixer, and an oxidation catalyst disposed within the internal volume and fluidly coupled to the selective catalytic reduction system.

In other embodiments, a housing for an aftertreatment system comprises an inlet, an outlet and a sidewall defining a recess therein. A base is positioned within the recess. The base includes an injection port which is in fluidic communication with an internal volume defined by the housing. Furthermore, the recess is structured to receive an injector such that the injector is disposed completely within the recess and is in fluidic communication with the internal volume via the injection port. The injection port is configured to inject an exhaust reductant into the internal volume.

In further embodiments, an apparatus for treating an exhaust gas comprises a housing defining an internal volume. The housing includes an inlet, an outlet and a sidewall defining a recess therein. A base is positioned within the recess. The base includes an injection port which is in communication with the internal volume. An injector is disposed on the base. Moreover, the injector is disposed completely within the recess. The injector is in fluidic communication with the internal volume via the injection port. The injector is configured to inject an exhaust reductant into the internal volume via the opening. A cover plate is disposed over the recess and is structured prevent objects from impacting the injector.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
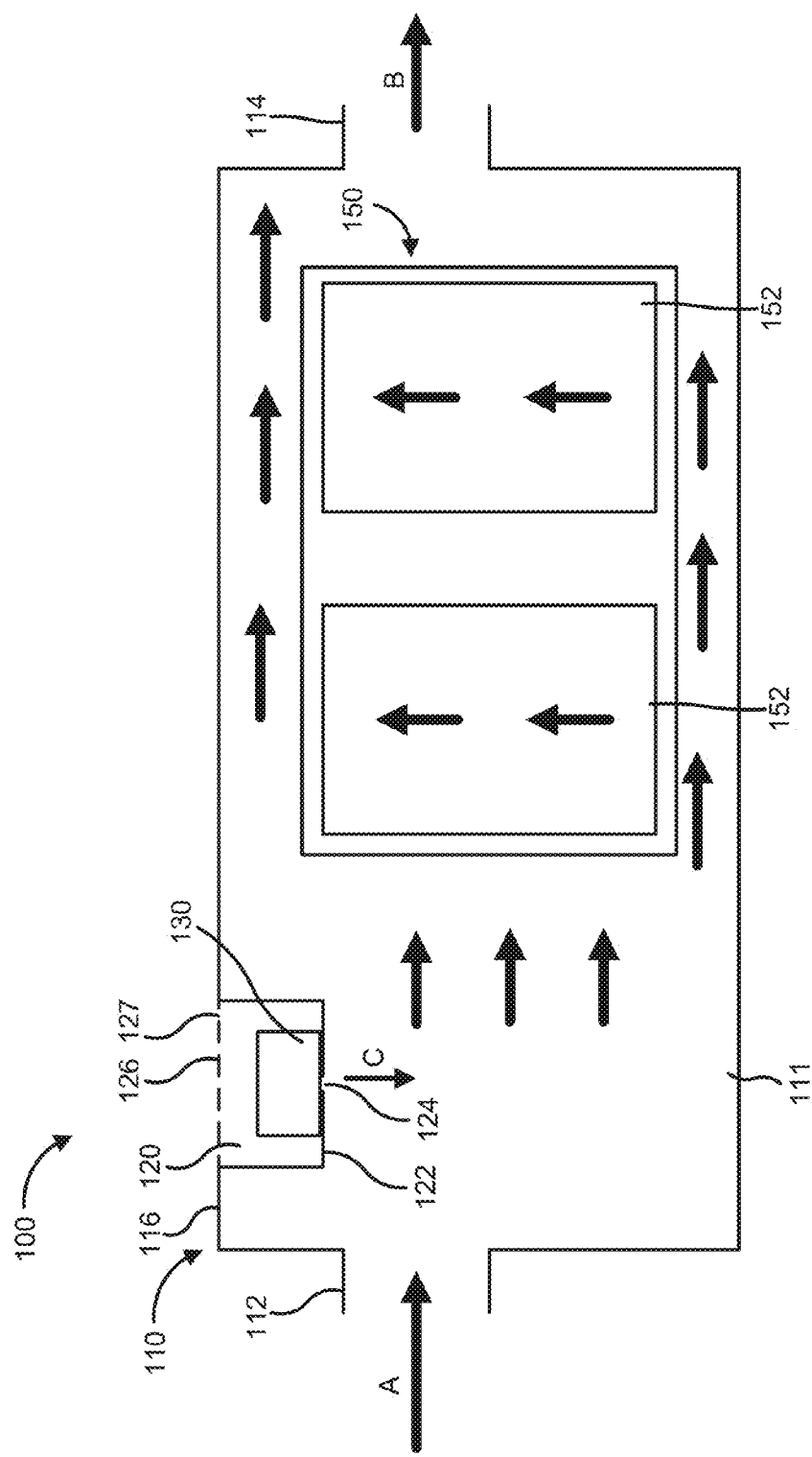
FIG. 1 is a schematic illustration of an aftertreatment system that includes a recess in which an injector is disposed, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to exhaust aftertreatment systems for use with IC engines, and in particular to exhaust aftertreatment systems that include an injector recessed within a housing of the aftertreatment system.

Embodiments described herein may provide several advantages over conventional aftertreatment systems including, for example: (1) recessing the injector within a housing of the aftertreatment system thereby protecting the injector from damage due to impacts, bumps or otherwise collisions; (2) disposing a cover plate over a recess within which the injector is disposed, which serves as a rock shield protecting the injector from impact or collision with rocks and debris; and (3) reducing the space requirement for disposing the aftertreatment system on a system such as a vehicle, thereby providing flexibility in installing the aftertreatment system and reducing cost.

FIG. 1 shows a schematic illustration of an aftertreatment system 100, according to an embodiment. The aftertreatment system 100 includes a housing 110 that defines a recess 120, an injector 130 disposed within the recess 120, and an SCR system 150 disposed within the housing 110.

The housing 110 defines an internal volume 111 within which the SCR system 150 is disposed. The housing 110 can be formed from a rigid, heat resistant, and/or corrosion resistant material. Suitable materials can include without limitation metals (e.g., stainless steel, iron, aluminum, alloys, etc.), ceramics, any other suitable material or a combination thereof. The housing 110 can define a circular, square, rectangular, polygonal, oval, or any other suitable cross section. Furthermore, the length of the housing 110 along the flow direction of the exhaust gas can be varied to increase or decrease the residence time of the exhaust gas within the housing 110.

The housing 110 includes an inlet 112 and an outlet 114. The inlet 112 is structured to receive an exhaust gas (e.g., a diesel exhaust gas) from an engine such as an IC engine (e.g., a diesel IC engine) in a direction shown by the arrow A. For example, the inlet 112 can be fixedly or removably coupled to an exhaust manifold or pipe of the engine to receive the exhaust gas. The outlet 114 is structured to expel the exhaust gas into the environment after the exhaust gas has been treated by the SCR system 150 in a direction shown by the arrow B.

The housing 110 includes a sidewall 116 that defines a recess 120 therein. As shown in FIG. 1, the recess 120 is defined proximal to the inlet 112. The recess 120 can be formed using any suitable process. For example, the housing 110 can be a casted, molded or stamped housing, and the recess 120 can be formed monolithically with the housing 110. In other embodiments, an opening can be defined on the sidewall 116 and then the recess 120 which can include a hollow cylinder can be disposed through the opening. An end of the hollow cylinder proximal to the sidewall 116 can then fixedly coupled to a rim of the opening using any suitable process, for example, welding (e.g., arc welding, gas welding, fusion bonding, etc.) thereby defining the recess 120. In this manner, the recess 120 can resemble a well within which the injector 130 can be disposed. Furthermore, the recess 120 can be formed strong and rigid materials, for example, metals.

The recess 120 can have any suitable cross-section such as, for example, circular, square, rectangular, elliptical, oval, polygonal, or any other suitable cross-section. In particular embodiments where the recess 120 has a circular cross-section, the diameter of the cross-section can vary. The depth of the recess can also vary depending upon the particular implementation.

A base 122 is positioned within the recess 120. The base 122 includes an injection port 124 which is in fluidic communication with the internal volume 111 of the housing 110. In one embodiment, the base 122 can include a plate fixedly coupled (e.g., via welding) to an end of the recess 120 distal to the sidewall 116. In other embodiments, the base 122 can be formed monolithically with the recess 120, for example, using a casting, molding, stamping, or any other suitable process. The injection port 124 can be formed by drilling or otherwise stamping a hole in the base 122. The injection port 124 therefore defines a fluidic channel between the recess 120 and the internal volume 111 of the housing 110.

An injector 130 is disposed on the base 122 such that the injector 130 is disposed completely within the recess 120. The injector 130 is in fluidic communication with the internal volume 111 via the injection port 124. The injector 130 is configured to inject an exhaust reductant into the internal volume 111 via the injection port 124 in a direction shown by the arrow C. The exhaust gas mixes with the exhaust reductant in the internal volume 111 to facilitate treatment of the exhaust gas by the SCR system 150. In some embodiments, the exhaust gas can include a diesel exhaust gas and the exhaust reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®).

Expanding further, the recess 120 is dimensioned (e.g., has a diameter, width or otherwise cross-section, and depth) such that the injector 130 is disposed completely within the recess 120. In other words, the injector 130 is recessed within the housing 110. By recessing the injector 130 in the housing 110, the injector 130 can be protected from impacts, bumps, collisions or otherwise physical damage thus extending the life of the injector 130 and the thereby, the aftertreatment system 100. Furthermore, a space required by the aftertreatment system 100 for disposing on a system (e.g., a vehicle) is also reduced.

In particular embodiments, the injector 130 can include a base plate (not shown) which can be removably coupled to the base 122 via at least one fastener. For example, the base plate can be a circular plate on which the injector 130 is fixedly or removably mounted. The base plate can be disposed on the base 122 and the injector 130 can be aligned with the injection port 124. The base plate can then be fastened via fasteners (e.g., screws, nuts, bolts, etc.), for example, to corresponding threaded openings defined in the base 122. In other embodiments, a handle can also be disposed on the base plate. The handle can be structured to be engaged by a user to either selectively dispose the injector 130 in the recess 120 or selectively remove the injector 130 from the recess 120.

A cover plate 126 can optionally be disposed over the recess 120. The cover plate 126 is structured to prevent objects such as rocks or debris from impacting the injector 130. The cover plate 126 can include a strong and rigid plate, for example, a metal plate or a plastic plate. The cover plate 126 can be removably coupled to the sidewall 116 defining the recess 120. For example, the cover plate 126 can be coupled to a portion of the sidewall 116 surrounding the recess 120 by at least one fastener (e.g., screws, nuts, bolts, etc.). In other embodiments, the cover plate 126 can be removably coupled to the sidewall 116 using a snap-fit mechanism.

A plurality of openings 127 can be defined in the cover plate 126. The plurality of openings 127 can include, for example, slits, circular openings, square openings, rectangular openings, or have any other shape or otherwise cross-section. The plurality of openings 127 allow air to be communicated into the recess 120. This allows heat to escape from the recess 120 which would otherwise be trapped within the recess 120 if the cover plate 126 does not include the plurality of openings 127. In some embodiments, the plurality of openings 127 can include circular openings having a diameter structured to prevent rocks having a predetermined cross-section from passing through the openings 127 and impacting the injector 130.

The SCR system 150 is disposed in the internal volume 111 and is structured to receive a mixture of the exhaust gas (e.g., a diesel exhaust gas) and the exhaust reductant (e.g., a diesel exhaust fluid). The SCR system 150 includes at least one catalyst 152 formulated to treat the exhaust gas. The exhaust reductant reacts with the exhaust gas to at least partially reduce one or more components of the gas (e.g., SOx and NOx), or facilitate reduction of the one or more components in the presence of the one or more catalysts 152.

The catalysts 152 can include any suitable catalyst such as, for example, platinum, palladium, rhodium, cerium, iron, manganese, copper, vanadium based catalyst, any other suitable catalyst, or a combination thereof. The catalysts 152 can be disposed on a suitable substrate such as, for example, a ceramic (e.g., cordierite) or metallic (e.g., kanthal) monolith core which can, for example, define a honeycomb structure. A washcoat can also be used as a carrier material for the catalysts 152. Such washcoat materials can include, for example, aluminum oxide, titanium dioxide, silicon dioxide, any other suitable washcoat material, or a combination thereof. The exhaust gas (e.g., diesel exhaust gas) can flow over and about the catalysts 152 such that any SOx and/or NOx gases included in the exhaust gas are further reduced to yield an exhaust gas which is substantially free of carbon monoxide, SOx and NOx gases.

As shown in FIG. 1, the SCR system 150 is disposed downstream of the recess 120. This allows the exhaust gas and the exhaust reductant to mix sufficiently in a portion of the internal volume upstream of the SCR system 150 before entering the SCR system 150. In particular embodiments, the internal volume 111 can be divided into a plurality of portions. For example, the internal volume 111 can be divided into a first portion proximal to the recess 120, and a second portion distal to the recess 120 within which the SCR system 150 can be disposed. The first portion and the second portion can be divided by a partition which can define an opening, a channel or a passageway so as to allow the exhaust gas and exhaust reductant mixture to flow from the first portion into the second portion. The first portion can be structured to allow the exhaust gas to sufficiently mix with the exhaust reductant to form a mixture which is then communicated to the SCR system 150.

In other embodiments, the aftertreatment system 100 can also include additional components, for example, a filter, a body mixer and/or an oxidation catalyst configured to facilitate treatment of the exhaust gas. Each of these components can be disposed in the internal volume 111 and fluidly coupled to the SCR system 150. For example, the filter can be disposed upstream of the SCR system 150 and can include any suitable filter (e.g., a diesel particulate filter) configured to filter and remove any particulates entrained within the exhaust gas flow to prevent such particulates from entering the SCR system 150. Such particles can include, for example, dust, soot, organic particles, crystals, or any other solid particulates present in the exhaust gas.

The body mixer can be structured to allow efficient mixing of the exhaust reductant with the exhaust gas before communicating the exhaust gas into the SCR system 150. The body mixture can be disposed upstream of the SCR system 150 (e.g., in the first portion of the internal volume 111, as described herein). The body mixer can include any suitable structures such as, for example, passageways, bluffs, vanes, partition walls, or any other features or structures to facilitate the mixing of the exhaust reductant with the exhaust gas.

The diesel oxidation catalyst can be disposed upstream or downstream of the SCR system 150. The diesel oxidation catalyst can be formulated to oxidize carbon monoxide, hydrocarbons, and/or particulate matter included in the exhaust gas flow. Moreover, the diesel oxidation catalyst can be formulated to have a low light-off temperature and/or a high tolerance to sulfur (e.g., SOx gases included in the exhaust gas). Suitable diesel oxidation catalysts can include, for example, platinum, palladium, aluminum oxide, or a combination thereof.

Figure 2:
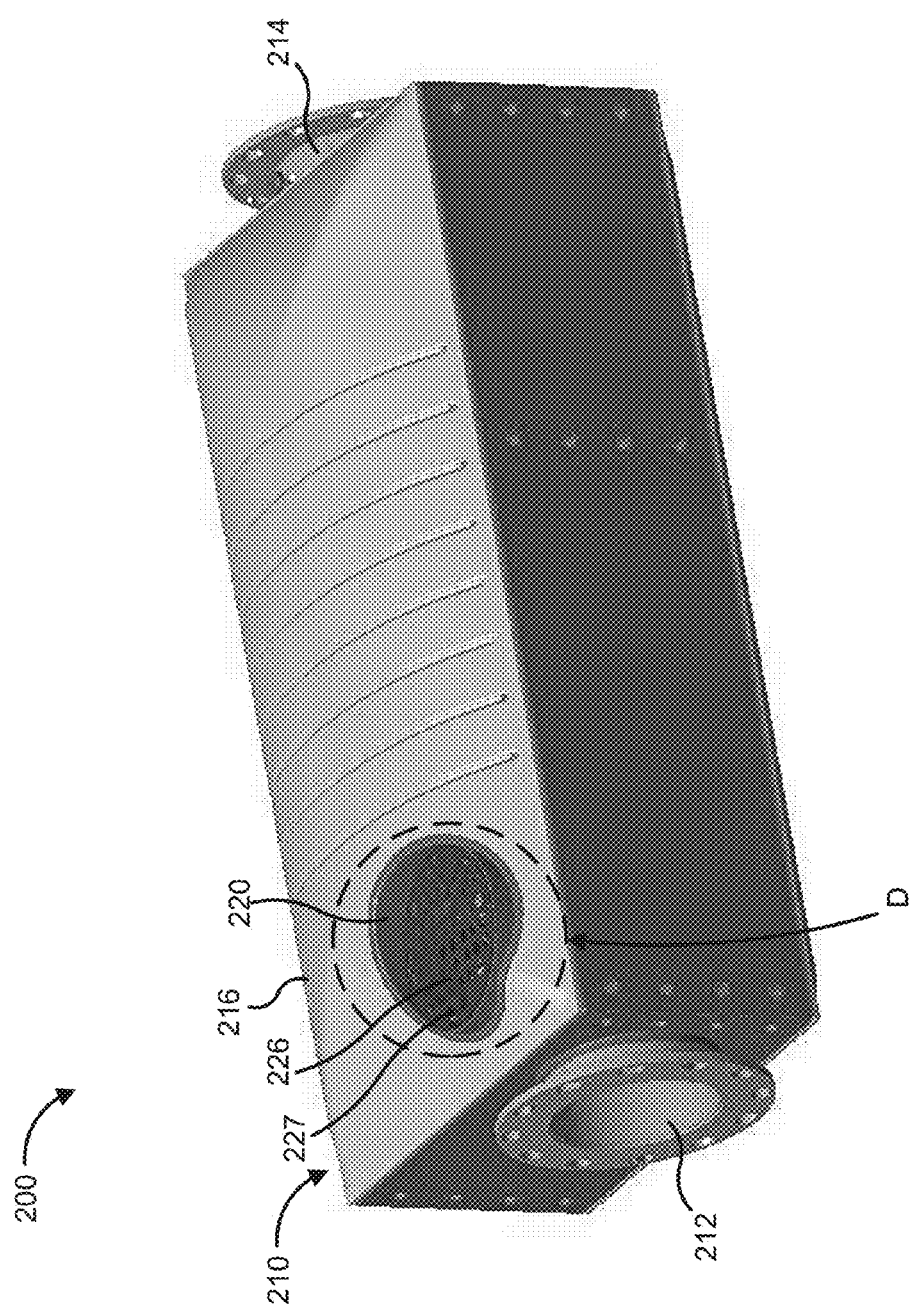
FIG. 2 is a perspective view of another embodiment of an aftertreatment system that includes a recess within which an injector is disposed.

FIG. 2 shows a perspective view of an exemplary aftertreatment system 200 that includes an injector 230 disposed within a recess 220 defined in a housing 210 of the aftertreatment system 200. The aftertreatment system 200 is structured to receive an exhaust gas (e.g., a diesel exhaust gas) from an engine (e.g., a diesel engine) and treat the exhaust gas.

The housing 210 defines an internal volume within which an SCR system (e.g., the SCR system 150 is disposed). Additional components such as a filter, body mixer and/or a diesel oxidation catalyst, as described with respect to the aftertreatment system 100, can also be disposed within the housing 210. The housing 210 can be formed from a rigid, heat resistant, and/or corrosion resistant material. Suitable materials can include without limitation metals (e.g., stainless steel, iron, aluminum, alloys, etc.), ceramics, any other suitable material or a combination thereof. The length of the housing 210 along the flow direction of the exhaust gas can be varied to increase or decrease the residence time of the exhaust gas within the housing 210.

The housing 210 includes an inlet 212 and an outlet 214. The inlet 212 is structured to receive an exhaust gas (e.g., a diesel exhaust gas) from an engine such as an IC engine (e.g., a diesel IC engine). The inlet 212 can be removably coupled to a first exhaust manifold or pipe (e.g., via fasteners such as screws, nuts, bolts, etc.) of an engine to receive the exhaust gas. The outlet 214 is structured to expel the exhaust gas into the environment after being treated by the SCR system disposed in the internal volume. The outlet 214 can also be removably coupled to a second exhaust pipe (e.g., via fasteners such as screws, nuts, bolts, etc.) structured to expel the treated exhaust gas to the environment.

Figure 3:
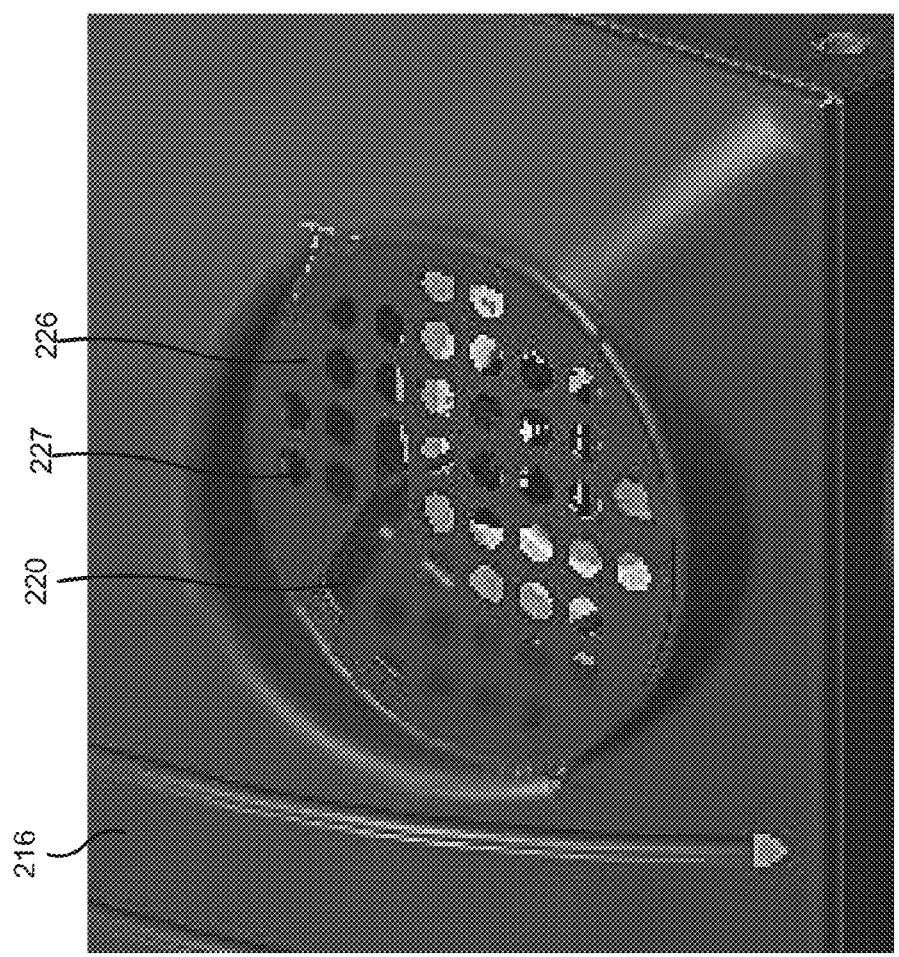
FIG. 3 shows an enlarged view of a portion of the aftertreatment system of FIG. 2 shown by the arrow D showing the recess with a cover plate disposed on the recess.
Figure 4:
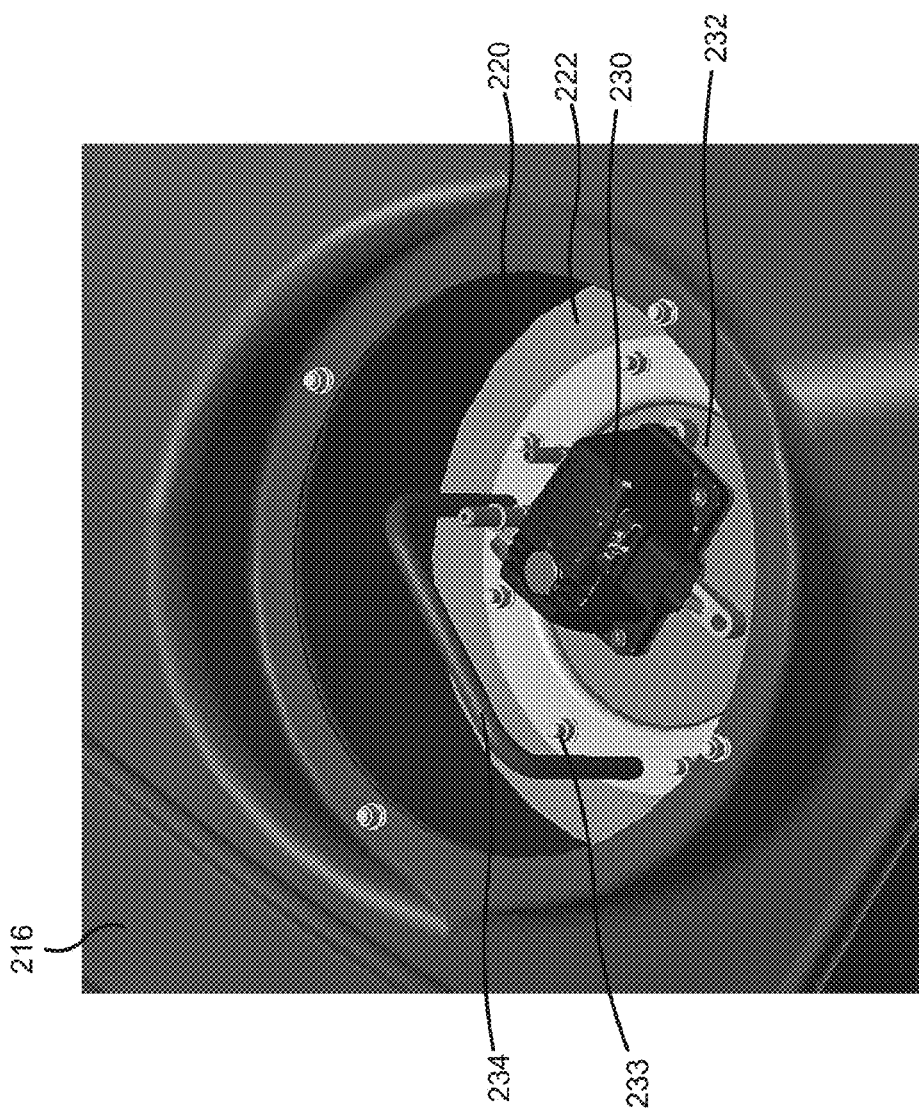
FIG. 4 shows the enlarged view of FIG. 3 with the cover plate removed showing the injector disposed on a base of the recess.

The housing 210 includes a sidewall 216 that defines a recess 220 therein. The recess 220 is defined proximal to the inlet 212. FIG. 3 shows an enlarged view of a portion of the housing 210 shown by the arrow D which includes the recess 220. As shown in FIG. 3, a cover plate 226 is disposed over the recess 220. FIG. 4 shows the portion of the housing 210 of FIG. 3 with the cover plate 226 removed. The cover plate 226 is structured to prevent objects from impacting the injector 230 disposed in the recess 220 (see FIG. 4). The cover plate 226 can include a strong and rigid plate, for example, a metal plate or a plastic plate. The cover plate 226 is removably coupled to the sidewall 216 defining the recess 220. The cover plate 226 can be removably coupled to a portion of the sidewall 216 surrounding the recess 220 by at least one fastener (e.g., screws, nuts, bolts, etc.). In other embodiments, the cover plate 226 can be removably coupled to the sidewall 216 using a snap-fit mechanism.

A plurality of openings 227 are defined in the cover plate 226. As shown in FIGS. 2-3, the plurality of openings 227 include a circular openings. The plurality of openings 227 are structured to allow air to be communicated into the recess 220 thus enabling heat to escape from the recess 220 which would otherwise be trapped within the recess 220. This trapped heat can negatively influence the performance of the injector 230. Moreover, the plurality of openings 227 can have a diameter structured to prevent rocks, debris or other objects having a predetermined cross-section from passing through the openings 227 and impacting the injector 230.

The recess 220 can be formed using any suitable process. For example, the housing 210 can be a casted housing 210 and the recess 220 can be formed monolithically with the housing 210. In other embodiments, an opening can be defined on the sidewall 216 and then a hollow cylinder can be disposed through the opening. An end of the hollow cylinder proximal to the sidewall 216 is coupled to a rim of the opening using any suitable process, for example, welding (e.g., arc welding, gas welding, fusion bonding, etc.), or via fasteners (e.g., screws, nuts, bolts, rivets, etc.) thereby defining the recess 220.

As shown in FIG. 4, the recess 220 has a circular cross-section. The diameter and depth of the recess 220 are defined such that the injector 230 is disposed completely within the recess 220. In other words, no portion of the injector 230 protrudes beyond a surface of the sidewall 216.

A base 222 is positioned within the recess 220. The base 222 includes an injection port (not shown) which is in fluidic communication with the internal volume of the housing 210. In one embodiments, the base 222 can include a plate fixedly coupled (e.g., via welding) to an end of the recess 220 distal to the sidewall 216. In other embodiments, the base 222 can be formed monolithically with the recess 220, for example, using a casting, molding, stamping process, or any other suitable process.

The injector 230 is disposed on the base 222 such that the injector 230 is disposed completely within the recess 220, as described herein. The injector 230 is in fluidic communication with the internal volume defined by the housing 210 via the injection port. The injector 230 is configured to inject an exhaust reductant into the internal volume via the injection port. The exhaust gas is mixed with the exhaust reductant in the internal volume to facilitate treatment of the exhaust gas by the SCR system. In some embodiments, the exhaust gas can include a diesel exhaust gas and the exhaust reductant can include a diesel exhaust fluid (as described with respect to the aftertreatment system 100).

The injector 230 includes a circular base plate 232 which is removably coupled to the base 222 via a plurality of fasteners (e.g., nuts, bolts, screws, etc.). The injector 230 can be fixedly mounted on the base plate 232. The base plate 232 can be disposed on the base 222 and the injector 230 can be aligned with the injection port. The base plate 232 can then be mounted via the fasteners 233, for example, to corresponding threaded openings defined on the base 222. A handle 234 is also disposed on the base plate 232. The handle 234 is structured to be engaged by a user to either selectively dispose the injector 230 in the recess 220 or selectively remove the injector 230 from the recess 220. This allows replacement of the injector 230 in case of malfunction without replacing the entire aftertreatment system 200.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An aftertreatment system, comprising:
a housing defining an internal volume and including:
an inlet,
an outlet,
a sidewall defining a recess therein, the recess comprising an opening defined in the sidewall, and a hollow cylinder positioned through the opening into the internal volume of the housing, a first end of the hollow cylinder coupled to a rim of the opening, and
a base positioned within the recess, the base coupled to a second end of the hollow cylinder opposite the first end such that the hollow cylinder and the base define a recess internal volume separate from the internal volume of the housing, the base including an injection port, the injection port in fluidic communication with the internal volume;
an injector disposed on the base, the injector disposed completely within the recess internal volume, the injector in fluidic communication with the internal volume of the housing via the injection port, the injector configured to inject an exhaust reductant into the internal volume via the injection port; and
a selective catalytic reductant system disposed in the internal volume and structured to receive a mixture of an exhaust gas and the exhaust reductant, the selective catalytic reduction system including at least one catalyst formulated to treat the exhaust gas.

2. The aftertreatment system of claim 1, wherein a cover plate is disposed over the recess, the cover plate structured to prevent objects from impacting the injector.

3. The aftertreatment system of claim 2, wherein the cover plate is removably coupled to the sidewall defining the recess.

4. The aftertreatment system of claim 2, wherein a plurality of openings are defined in the cover plate.

5. The aftertreatment system of claim 1, wherein the recess has a circular cross-section.

6. The aftertreatment system of claim 1, wherein the injector includes a base plate, the base plate removably coupled to the base of the recess via at least one fastener.

7. The aftertreatment system of claim 6, wherein a handle is disposed on the base plate, the handle structured to be engaged by a user to either selectively dispose the injector in the recess or selectively remove the injector from the recess.

8. The aftertreatment system of claim 1, further comprising at least one of a filter, a body mixer, and an oxidation catalyst disposed within the internal volume of the housing and fluidly coupled to the selective catalytic reduction system.

9. A housing for an aftertreatment system, comprising:
an inlet;
an outlet;
a sidewall defining a recess therein, the recess comprising an opening defined in the sidewall, and a hollow cylinder positioned through the opening into the internal volume of the housing, a first end of the hollow cylinder coupled to a rim of the opening; and
a base positioned within the recess, the base coupled to a second end of the hollow cylinder opposite the first such that the hollow cylinder and the base define a recess internal volume separate from the internal volume of the housing, the base including an injection port, the injection port in fluidic communication with an internal volume defined by the housing, wherein the recess is structured to receive an injector such that the injector is disposed completely within the recess internal volume and is in fluidic communication with the internal volume via the injection port, the injector configured to inject an exhaust reductant into the internal volume via the injection port.

10. The housing of claim 9, wherein the recess is defined proximal to the inlet.

11. The housing of claim 9, further comprising:
a cover plate disposed over the recess, the cover plate structured to prevent objects from impacting the injector.

12. The housing of claim 11, wherein the cover plate is removably coupled to the sidewall defining the recess.

13. The housing of claim 11, wherein a plurality of openings are defined in the cover plate.

14. The housing of claim 9, wherein the recess has a circular cross-section.

15. The housing of claim 11, wherein the injector includes a base plate, the base plate removably coupled to the base of the recess via at least one fastener.

16. The housing of claim 15, wherein a handle is disposed on the base plate, the handle structured to be engaged by a user to selectively dispose the injector in the recess and selectively remove the injector from the recess.

17. An apparatus for treating an exhaust gas, comprising:
a housing defining an internal volume and including:
an inlet,
an outlet,
a sidewall defining a recess therein, the recess comprising an opening defined in the sidewall, and a hollow cylinder positioned through the opening into the internal volume of the housing, a first end of the hollow cylinder coupled to a rim of the opening, and
a base positioned within the recess, the base coupled to a second end of the hollow cylinder opposite the first end such that the hollow cylinder and the base define a recess internal volume separate from the internal volume of the housing, the base including an injection port, the injection port in fluidic communication with the internal volume;
an injector disposed on the base of the recess, the injector disposed completely within the recess internal volume, the injector in fluidic communication with the internal volume via the injection port, the injector configured to inject an exhaust reductant into the internal volume via the injection port; and
a cover plate disposed over the recess, the cover plate structured to prevent objects from impacting the injector.

18. The apparatus of claim 17, wherein the recess is defined proximal to the inlet.

19. The apparatus of claim 17, wherein the cover plate is removably coupled to the sidewall defining the recess.

20. The apparatus of claim 17, wherein the injector includes a base plate, the base plate removably coupled to the base of the recess via at least one fastener.

21. The apparatus of claim 20, wherein a handle is disposed on the base plate, the handle structured to be engaged by a user to selectively dispose the injector in the recess and selectively remove the injector from the recess.

* * * * *